United States Patent [19]

Dill et al.

[11] Patent Number: 5,058,678

[45] Date of Patent: Oct. 22, 1991

[54] METHOD FOR PREVENTING THE FORMATION OF SLUDGE IN CRUDE OIL

[75] Inventors: Walter R. Dill; James L. Lane, Jr., both of Duncan, Okla.

[73] Assignee: Halliburton Company, Duncan, Okla.

[21] Appl. No.: 589,568

[22] Filed: Sep. 28, 1990

[51] Int. Cl.$^5$ .............................................. E21B 43/27
[52] U.S. Cl. .................................... 166/279; 166/304; 166/307; 252/8.552; 252/8.553
[58] Field of Search ............... 166/271, 279, 304, 307, 166/310, 312; 252/8.552, 8.553, 148, 174.21, 547, DIG. 14

[56] References Cited

U.S. PATENT DOCUMENTS

| | | |
|---|---|---|
| 3,142,335 | 7/1964 | Dill et al. |
| 3,251,415 | 5/1966 | Bombardieri et al. |
| 3,402,770 | 9/1968 | Messenger. |
| 4,068,720 | 1/1978 | Hessert et al. ........................ 166/282 |
| 4,096,914 | 6/1978 | McLaughlin et al. ............... 166/307 |
| 4,163,727 | 8/1979 | Inks ...................................... 166/307 |
| 4,207,193 | 6/1980 | Ford et al. ........................... 166/304 |
| 4,317,735 | 3/1982 | Crowe ................................. 166/307 |
| 4,371,443 | 2/1983 | Keeney ............................... 166/300 |
| 4,574,050 | 3/1986 | Crowe ................................. 166/307 |
| 4,633,949 | 1/1987 | Crowe ........................... 252/8.553 X |
| 4,679,631 | 7/1987 | Dill et al. ............................. 166/307 |
| 4,683,954 | 8/1987 | Walker et al. ....................... 166/307 |
| 4,737,296 | 4/1988 | Watkins .............................. 166/307 |
| 4,738,789 | 4/1988 | Jones .................................. 166/307 |
| 4,823,874 | 4/1989 | Ford .................................... 166/279 |
| 4,949,790 | 8/1990 | Dill et al. ............................. 166/307 |

*Primary Examiner*—George A. Suchfield
*Attorney, Agent, or Firm*—Thomas R. Weaver

[57] ABSTRACT

An aqueous acidic composition useful for conducting a formation acidizing method is disclosed. The composition, which is comprised of a blend of acetic acid, formic acid, a fatty alkyl quaternary ammonium salt, a fatty aralkyl quaternary ammonium salt and an alkanoic and/or alkenoic acid having at least four carbon atoms and at least two alcoholic hydroxyl groups per molecule, resists the formation of sludge, and insoluble ferric and calcium compounds.

14 Claims, No Drawings

METHOD FOR PREVENTING THE FORMATION OF SLUDGE IN CRUDE OIL

BACKGROUND OF THE INVENTION

1. Technical Field of the Invention

This invention generally relates to the treatment of a subterranean calcareous formation containing crude oil with an acidic composition to aid in the recovery of the crude oil from the formation. The invention more particularly relates to the treatment of the formation with a specific aqueous acidic composition formulated to resist the formation of sludge in the crude oil.

For purposes of this invention, sludge is defined as a solid material formed in crude oil containing asphaltenes and maltenes which constituents may, under certain conditions, precipitate from the crude oil. Formation of sludge in crude oil while the crude oil is in the formation can render very difficult the task of recovery of the oil from the formation. For purposes of this invention crude oil containing quantities of asphaltenes and maltenes subject to the formation of sludge is referred to as heavy crude and sometimes as sludging crude.

2. Description of the Prior Art and Problem Solved

Formation acidizing or, simply, acidizing, is a method well known in the prior art utilized to increase the flow of fluid from a subterranean formation; under the method the formation is contacted with an acidic composition to react with and dissolve materials contained therein for the purpose of increasing the permeability of the formation. The flow of fluid from the formation is therefor increased because of the increase in formation permeability caused by the dissolution of the material. A known method of acidizing a subterranean formation comprises the steps of: conducting an acid composition to the formation through tubing disposed in a borehole penetrating the subterranean formation; forcing the acid composition into contact with the formation and permitting the acid to react with and dissolve certain materials contained therein to thereby enlarge pore spaces within the formation and thus to increase the permeability thereof. Acidizing calcareous formations, such as limestone, has been successfully conducted utilizing hydrochloric acid, certain organic acids, such as acetic acid, citric acid and formic acid, and mixtures thereof.

The object of formation acidizing—increasing formation permeability—can be frustrated if the specific acid employed in the treatment provides an environment which fosters the production of precipitates within the formation which fill and plug the pore spaces in the formation with the consequent result of failing to increase and possibly even decreasing formation permeability. One such undesirable result features the precipitation of ferric iron compounds such as ferric hydroxide from the acid composition used to perform the acidizing. Hydrochloric acid upon spending to ph values of about 2.5 and greater permits the precipitation of ferric hydroxide. The iron precipitated can be introduced into the formation by reaction of hydrochloric acid with iron compounds in the tubing used to conduct the acid to the formation; the iron can be a natural constituent of the formation. Iron control is thus a problem.

Hydrochloric acid may precipitate sludge from the crude oil contacted. The quantity of precipitated sludge is a function of formation temperature, acid concentration, ferric iron concentration and the concentration of asphaltenes and maltenes in the crude oil.

Other acids, such as formic acid and acetic acid, upon spending can cause precipitation of calcium salts if the concentration of the acids are not limited so that the solubility of the salt is not exceeded.

The iron control problem was addressed in U.S. Pat. No. 3,142,335 to Dill, et al., wherein formation acidizing is conducted using an acidic composition of hydrochloric acid and an iron sequestering agent containing a mixture of ingredients such as citric acid or a salt thereof with acetic acid or formic acid or salts thereof.

Crowe, in U.S. Pat. No. 4,317,735, presents an extensive discussion of prior U. S. patents which address the iron control problem. The patents discussed all principally rely on the use of iron sequestering agents mixed with the acidizing medium to prevent the precipitation of iron compounds.

Crowe criticized the use of most prior art sequestering agents because they become ineffective at temperatures in the range of from about 125° to about 150° F.

Crowe further reports that U.S. Pat. No. 4,096,914 teaches that ferric iron reacts with asphaltenic oil to form insoluble iron-asphaltene compounds. It is suggested that incorporation of salicylic acid into the treatment acid will prevent the formation of such compounds.

Crowe, in U.S. Pat. No. 4,317,735, is particularly concerned that acidizing compositions gelled with aqueous xanthan gums crosslink in the presence of ferric ions upon spending to a ph value in excess of about 1.5 Crowe teaches the solution of this crosslinking problem by including in the gelled acid a soluble alkanoic and/or alkenoic acid additive having at least 4 carbon atoms and bearing at least 2 hydroxyl groups per molecule and/or a soluble salt or gamma-lactone thereof. The additive which includes ascorbic acid, erythorbic acid and their alkali metal salts is said to inhibit the formation or presence of ferric ions in solution and/or the formation of ferric compounds. Crowe comments that the treatment acid utilized together with the xanthan gum and additive can be a mixture of formic acid and acetic acid.

DISCLOSURE OF INVENTION

This invention provides an aqueous acidic composition comprised of a mixture of organic acids; the composition is useful in the acidizing of oil-bearing, subterranean calcareous formations. When used in accordance with this invention, the composition will dissolve portions of the formation to thereby increase the permeability thereof, but it will not produce, foster or otherwise generate an environment conducive to the formation of sludge, insoluble ferric compounds or insoluble calcium compounds. The composition is accordingly a specific combination of ingredients including: a blend of organic acids; a blend of chemicals referred to herein as anti-sludge agents which inhibit the precipitation of asphaltenes and maltenes from heavy crude oil; and chemicals referred to herein as iron control agents which inhibit the precipitation of ferric compounds. It has been found that sludge will be produced in heavy crude upon treatment thereof with the blend of organic acids if the entire blend of anti-sludge agents and the iron control agents are not present in the composition.

The anti-sludge agents and the iron control agents, being additives to the blend of organic acids, do have a tendency to separate from the organic acids to thereby produce a multiphase mixture of ingredients, but the sludge control feature of the invention remains operative and is not reduced by additive separation. Solubilizing agents may be added to the composition to prevent additive separation. Solubilizing agents employed in this invention do not have an adverse effect on the ability of the composition to react with the formation to increase permeability, to prevent sludge formation or to control iron.

Additive separation at formation temperatures of about 194° F. and greater does occur in prior art hydrochloric acid systems in the presence of ferric iron, but additive separation does not occur in the organic acid system of this invention under the same conditions. Thus in another aspect this invention controls additive separation at elevated temperatures.

Corrosion inhibitors may be added to the organic acid composition of this invention to reduce the reaction of the acid on iron and steel equipment utilized in the performance of a formation acidizing operation. Accordingly, the introduction of iron ions into the acidizing composition can be at least partially eliminated at one source, the tubular goods, by use of a suitable corrosion inhibitor. As in the case of the solubilizing agents, the presence or absence of a corrosion inhibitor does not have an adverse effect on the ability of the composition of this invention to prevent precipitation of sludge.

It is to be noted that presence of the solubilizing agent mentioned above will also prevent separation of the additive corrosion inhibitor from the composition.

It has been found that use of this composition in a formation acidizing setting when all of the ingredients generally referred to above are present will prevent additive separation from the organic acid system at temperatures up to at least 194° F., that insoluble ferric compounds will not be produced and that sludge will not form even at ferric ion concentrations as high as about 20,000 milligrams of ferric ion per liter of solution or at concentrations as high as about 10,000 milligrams of ferric ion per liter along with 10,000 milligrams of ferrous ion per liter. (For convenience of units conversion, 15,000 milligrams of iron per liter is equal to about 0.125 pounds of iron per gallon.)

To summarize the benefits of the composition of this invention: additive separation is controlled at temperatures of 194° F. and greater even at ferric ion concentration of up to about 20,000 milligrams per liter; acid corrosion of equipment utilized is controlled; aqueous/oil emulsions are substantially eliminated; the organic acids utilized dissolve very small amounts of iron scale, thus introduction of iron into the formation from the equipment utilized is minimized and the iron that is dissolved is primarily ferrous iron; the organic acid composition of this invention does not react as rapidly as does equivalent 15% HCl on formation rock, thus the organic acid composition of this invention does achieve deeper penetration of live acid into the formation; the specific concentration of organic acids utilized upon reaction do not result in the production of insoluble calcium formate and insoluble calcium acetate; and sludge is not produced at temperatures up to at least 200° F.

The acidic portion of the aqueous acidic composition of this invention consists of a blend of acetic acid and formic acid. These acids are present in a concentration great enough to effectively react with and dissolve the acid soluble portion of a calcareous formation so as to increase the permeability of the formation and yet the concentrations of each of the acids must not be greater than the amount which would cause the precipitation of either calcium formate or calcium acetate. In this regard the solubility of calcium formate can be exceeded with consequent precipitation if the concentration of formic acid exceeds about 11 percent formic acid by weight of solution. Also the solubility of calcium acetate can be exceeded with consequent precipitation if the concentration of acetic acid exceeds about 21 percent acetic acid by weight of solution.

Satisfactory results have been achieved by using a blend having the power to dissolve calcium carbonate equal to that of a 15% hydrochloric acid solution. Such a blend would include acetic acid having a concentration of about 11.1 percent by weight and formic acid having a concentration of about 10.5 percent by weight. A blend having the dissolving power of 20% hydrochloric acid can be produced by increasing the concentration of acetic acid to about 20 percent by weight.

The organic acid blend of this invention reacts more slowly than an equivalent concentration of hydrochloric acid (as explained above), therefor the blend of this invention can penetrate deeper into a formation before becoming completely spent. Furthermore, by not exceeding the acid concentrations referred to above undesirable calcium precipitates will not form to thereby reduce formation permeability.

Another advantage of the organic acids utilized in this invention is that the acids do not readily dissolve ferric ion scales. Any tendency of a sludging crude to produce sludge in the presence of an acid is enhanced by the additional presence of ferric ion. (See Example XII below). Accordingly, that ferric ions are not introduced into contact with a sludging crude because the acid used does not readily dissolve ferric scale from, for example, the tubular goods used to transport the acid to the formation, is a distinct advantage.

The blend of organic acids used in this invention can be conveniently prepared by combining a formic acid solution having a suitably high formic acid content of about 85% by weight or more with a suitable source of acetic acid such as glacial acetic acid, acetic anhydride or mixtures thereof. The weight of acids blended taken together with all of the ingredients of the acidic composition of this invention including dilution with water should not be sufficient to exceed the weight concentrations mentioned previously in order to avoid the formation of calcium precipitates.

In one embodiment of this invention, as exemplified in Example XII below, 10 volume parts of a solution consisting of 1.5 weight parts of acetic anhydride and 1.0 weight part of glacial acetic acid when mixed with 10.5 volume parts of 88 weight percent formic acid and then combined with the balance of the ingredients of the composition and diluted with water to 100 volume parts will produce an aqueous solution containing about 10.51 weight percent (9.089 volume percent) formic acid and about 11.15 weight percent (11.184 volume percent) acetic acid.

It was mentioned earlier that the organic acids utilized do not readily dissolve ferric iron scales (See Example VI) to thus avoid a primary initiator of sludge [See Example XII). But since the acids do attack ferrous metals a suitable acid corrosion inhibitor for organic acids is preferably employed in the composition of this invention.

Suitable organic acid inhibitors are commercially available and should be added to the composition in quantity sufficient to maintain a corrosion rate of less than 0.05 lbs. iron per square foot. One suitable such inhibitor is a blend of aromatic quaternary amines combined with a suitable dispersing agent such as an ethoxylated aryl alcohol. A particularly favored inhibitor is comprised of a blend of fuzed 5 and 6 member quaternized heterocyclic nitrogen compounds and alkyl benzene amines. It is believed that a quantity of amine inhibitor in the range of from about 0.2 to about 0.3 percent inhibitor by volume of acidic composition will provide sufficient acid inhibition.

The anti-sludge agent useful in this invention is essentially a combination of three ingredients of which two are quaternary ammonium salts, which are cationic in nature, and one is selected from the group consisting of water soluble hydroxy alkanoic and alkenoic acids or mixtures thereof.

One of the quaternary ammonium salts useful herein as an anti-sludge agent is broadly defined as a mixture of straight-chain hydrocarbon quaternary ammonium salts wherein the hydrocarbon groups are substantially saturated. Accordingly, and more narrowly, this component is a mixture of fatty alkyl quaternary ammonium salts of the general formula

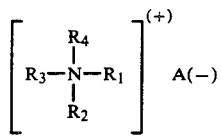

wherein:
N is nitrogen;
A is an anion selected from halides, sulfate, formate or acetate;
$R_1$ is an alkyl group having 1 to 3 carbon atoms;
$R_2$ is an alkyl group having 1 to 3 carbon atoms;
$R_3$ is a straight chain hydrocarbon group, being substantially saturated, and having in the range of 8 to 18 carbon atoms; and
$R_4$ is a straight chain hydrocarbon group, being substantially saturated, and having in the range of 8 to 18 carbon atoms.

In a preferred embodiment each of the $R_3$ and $R_4$ groups in the above structure have in the range of 12 to 16 carbon atoms and most preferably in the range of about 12 to 14 carbon atoms.

The above described quaternary ammonium salt is disclosed by Ford in U.S. Pat. No. 4,823,874 to be useful as an anti-sludge agent in aqueous hydrochloric acid solutions.

A mixture of fatty alkyl quaternary ammonium salts found to be particularly useful herein are those consisting of dimethyl quaternary ammonium chloride and coconut oil and is conveniently referred to as dimethyl dicoco quaternary ammonium chloride.

The fatty alkyl quaternary ammonium salts are present in the acidic composition of this invention in an amount sufficient to help prevent the formation of sludge; it is believed that this amount is in the range of from about 0.275 to about 1.1 percent of salt by volume of composition and preferably about 0.55 percent salt by volume of composition.

The second of the two quaternary ammonium salts useful herein as an anti-sludge agent is broadly defined as a mixture of quaternary ammonium salts containing a straight-chain hydrocarbon group and an aromatic group wherein the straight-chain hydrocarbon group is substantially saturated. Accordingly, and more narrowly, this component is a mixture of fatty aralkyl alkyl quaternary ammonium salts of the general formula.

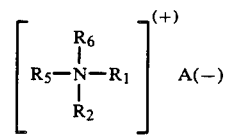

wherein:
N, A, $R_1$ and $R_2$ are as defined previously; and
$R_5$ is a straight chain hydrocarbon group being substantially saturated, and having in the range of 12 to 18 carbon atoms; and
$R_6$ is an aralkyl group having in the range of 7 to 10 carbons atoms.

In a preferred embodiment the $R_5$ group has in the range of 14 to 18 carbon atoms and most preferably in the range of 16 to 18 carbon atoms.

A mixture of fatty aralkyl alkyl quaternary ammonium salts found to be particularly useful herein are those consisting of dimethyl benzyl quaternary ammonium chloride and tallow oil and is conveniently referred to as dimethyl benzyl tallow ammonium chloride.

The fatty aralkyl alkyl quaternary ammonium salts are present in the acidic composition of this invention in an amount sufficient to help prevent the formation of sludge; it is believed that this amount is in the range of from about 0.11 to about 0.825 percent salt by volume of composition and preferably about 0.275 percent salt by volume of composition. It is noted that sludge prevention is obtained when the ratio of the percent by volume of fatty alkyl quaternary ammonium salt to the percent by volume of fatty aralkyl quaternary ammonium salt is in the range of from about 0.33 to 10 and that very satisfactory results are obtained when the ratio is in the range of 1.3 to about 3 and preferably about 2.

The quaternary ammonium salt anti-sludge agents may be added to the composition together with a quantity of methanol and isopropanol (about 60 percent by volume of the anti-sludge agents) to aid in the solubility of the agents in the composition.

The third anti-sludge ingredient of the acid composition of this invention also referred to herein as an iron control agent, is a water soluble monobasic alkanoic and/or alkenoic acid, having at least four carbon atoms and bearing at least two alcoholic hydroxyl groups per molecule, and/or a soluble salt or $\gamma$-lactone of said acid, and/or a soluble salt thereof. This ingredient is disclosed by Crowe in U.S. Pat. No. 4,574,050 to be useful to prevent the formation of ferric compounds such as ferric hydroxide from spent acid solutions containing iron. Crowe also notes U.S. Pat. No. 4,096,914 as teaching that ferric iron reacts with asphaltenic oil to form insoluble iron asphaltene compounds. As was pointed out above the organic acids utilized herein are not known to dissolve large quantities of scale containing ferric iron. Accordingly, the iron control agent of this invention is believed to act more in the nature of an adjunct to the above described quaternary ammonium salts in the prevention of sludge.

Members of this known class of organic compounds include ascorbic acid, erythorbic acid and other isomers of the general formula

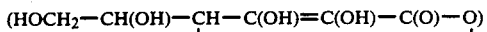

dehydroascorbic acid,

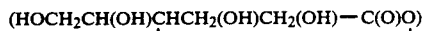

2,3 diketo-L-gluconic acid γ-lactone

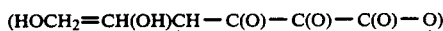

and the corresponding acid, threonic acid (HOCH$_2$C—H(OH)C(0H—COOH), and the like. In many instances, it is a procedural advantage to add these compounds to the treatment acid as the alkali metal or ammonium salts thereof because of the faster dissolution rate of the salts. Of course, when the salts are dissolved in the treatment acid, the salts are converted to the corresponding organic acid.

Crowe further discloses in U.S. Pat. No. 4,574,050 that the iron control agent referred to herein may be used with formic acid and acetic acid. (In this regard, note Example XII).

The preferred iron control agents are ascorbic acid, erythorbic acid and the alkali metal salts thereof. The most preferred agent is sodium erythorbate.

The iron control agent must be present in the composition even if there is no ferric ion known to be present. As was previously noted all three anti-sludge agents must be present in the composition to enable the anti-sludging acid composition to prevent sludging in a wide variety of sludging crudes. (Example XII). The iron control agent is thus present in an amount sufficient to help prevent the formation of sludge which, in the absence of ferric ion, is believed to be at least about 0.23 lb-moles iron control agent per 1000 gallons of composition. When ferric iron is present the concentration of iron control agent, which is a function of the concentration of ferric ion, is believed to be in the range of from about 0.34 to about 0.54 moles of iron control agent per mole of ferric ion.

The combination of the organic acids and the anti-sludging agents do tend to suffer phase separation. While phase separation does not reduce the sludge prevention properties of the composition, phase separation can be prevented and the aqueous acidic composition may be maintained in a single phase by the addition of one or more solubilizing agents.

In a preferred embodiment two solubilizing agents are utilized. One of the agents is a polyoxyethylene ether alcohol preferably present in the composition in the range of from about 0.035 to about 0.7 percent by volume and still more preferably about 0.35 percent by volume of the acidic composition.

The polyoxyethylene ether alcohol is preferably an ethoxylated fatty alcohol wherein a substantially saturated fatty alcohol having in the range of 10 to 15 carbon atoms is reacted with from about 1 to about 30 moles of ethylene oxide. Most preferably the fatty alcohol is a saturated compound having 13 carbon atoms. This ingredient may be added to the composition together with a small quantity of methanol and ethylene glycol (about 10 percent by volume of the added solubilizing agent) to aid in the solubility and to depress the freezing point of the agent.

The second of the two solubilizing agents is an oxyalkylated alkyl phenol preferably present in the composition in the range of from about 0 to about 0.6 percent by volume of the acidic composition.

The oxyalkylated alkyl phenol is preferably an ethoxylated alkyl phenol wherein the basic phenol has been reacted with from about 1 to about 30 moles of ethylene oxide and the alkyl substituent has in the range of from about 6 to 10 carbon atoms. Most preferably the oxyalkylated alkyl phenol is polyoxyethylene-4nonyl phenol. This ingredient may be added to the composition together with a small quantity of methanol and a dialkyl glycol such as 2,2'-oxybisethanol (about 33 percent by volume of the added solubilizing agent) to aid in the solubility and to depress the freezing point of the agent.

Separation of the additives from the composition is enhanced by the presence of ferric ion. Thus, if ferric ion is present in an amount less than about 5000 milligrams per liter of composition then the phenol solubilizing agent is not required. However, concentrations of ferric ion in amounts greater than about 5000 milligrams per liter indicates a need for the phenol in an amount equal to about 0.6 percent by volume of composition.

EXAMPLES

In the Examples provided below there are tests which compare results obtained utilizing 15% hydrochloric acid with results obtained utilizing organic acid blends of this invention. The recipes of the organic acid blends utilized in the examples are given below:

| Component | Amount, Volumes | | | | |
|---|---|---|---|---|---|
| | Blend A | Blend B | Blend C | Blend D | Blend E |
| Glacial acetic acid | — | 120 | — | — | 112 |
| Formic acid (85%) | — | 110 | — | — | 110 |
| 1.5 wt parts acetic anhydride 1 wt part glacial acetic acid | 100 | — | 100 | 100 | — |
| Formic acid (88%) | 105 | — | 105 | 105 | — |
| Anti-sludge Agent A | 5.5 | — | 5.5 | 5.5 | 5.5 |
| Anti-sludge Agent B | 2.75 | — | 2.75 | 2.75 | 2.75 |
| Solubilizer A | 5.98 | — | 5.98 | 5.98 | 5.98 |
| Solubilizer B | 3.5 | — | 7.0 | 10.5 | 3.5 |
| Acid Inhibitor | 2.7 | — | 2.7 | 2.7 | 2.7 |
| Organic Solvents | 6.775 | — | 6.775 | 6.775 | 6.775 |
| Freezing point depressants | 0.575 | — | 0.575 | 0.575 | 0.575 |
| Dispersant | 0.3 | — | 0.3 | 0.3 | 0.3 |
| Water | 766.92 | 770 | 763.42 | 759.92 | 749.92 |

Anti-sludge Agent A is dimethyldicoco quaternary ammonium chloride.

Anti-sludge Agent B is dimethyl benzyl tallow quaternary ammonium chloride.

Solubilizer A is an ethoxylated nonyl phenol having in the range of 1 to 30 ethylene oxide units.

Solubilizer B is an ethoxylated fatty alcohol having 13 carbon atoms in the fatty alcohol substituent and in the range of 1 to 30 ethylene oxide units.

The acid inhibitor is a commercially available quaternary amine containing an ethoxylated nonyl phenol dispersant.

The organic solvents are a blend of methanol and isopropanol.

The freezing point depressants are a blend of ethylene and diethylene glycol.

The organic acid blends utilized in the examples and 15% hydrochloric acid have the same active hydrogen ion concentration in that 2 ml of 15% hydrochloric acid and 2 ml of the organic acid blends each, upon titration with 44.2 ml of 0.2 N sodium hydroxide, produce the same phenolphthalein end point (—7.8 pH).

Ferric iron is included in some of the test solutions. The iron source of these solutions is a standard solution of ferric chloride containing 200,000 mg $Fe+3$ per liter. Fifty ml of acid having added thereto 1.25 ml of the standard solution produce a solution having 5000 mg $Fe+3$ per liter. Fifty ml of acid having added thereto 5 ml of the standard solution produce a solution having 20,000 mg $Fe+3$ per liter.

The tests were conducted at temperatures intended to simulate an expected reservoir temperature of 194° F.

Perhaps to repeat some of the information previously provided concerning the problems to be solved and to provide a setting for the examples it is noted that: Acid introduced into an oil producing formation may cause precipitation of asphaltenes and maltenes from the crude oil contacted. Precipitated asphaltenes and maltenes are referred to as sludge. Sludge may plug formation flow channels to the well bore to thereby decrease the effectiveness of an acidizing operation. Ferric iron, such as that dissolved from the tubulars by acid, enhances the formation of sludge. The effect of dissolved iron can be minimized by pickling the tubulars and recovering the pickling acid prior to acidizing the formation or by using an acid that does not dissolve ferric scale. The amount of sludge precipitated is enhanced by increased temperature, increased concentrations of hydrochloric acid and the concentration of dissolved ferric iron in the acid. The amount of sludge is also dependent on the concentration of asphaltenes and maltenes in the crude oil.

EXAMPLE I

Asphaltene and Maltene Content of Crude Oils

Crude oils available were analyzed to determine their asphaltene and maltene content. Asphaltenes are defined as being insoluble in n-pentane, while maltenes are defined as being soluble in n-pentane.[1]

Bunger, J.W. and Norman, C.L.: "Chemistry of Asphaltenes, " Advances in Chemicals series-195, American Chemical Society, 1981, pages 208.

The crude oils tested were divided into 2 groups: (1) Old Crudes—over 3 months old, based on sampling date. (2) New Crudes—one to 2 months old, based on sampling date. Asphaltene and maltene content of each crude oil is shown in Table 1.

TABLE 1

Asphaltene and Maltene Content of Crude Oils

| Crude Name | Asphaltene Content (%) | Maltene Content (%) |
|---|---|---|
| Old Crudes | | |
| H Oil | 9.29 | 3.83 |
| Judy Creek | 0.38 | 4.30 |
| G 2-10 | 2.64 | 7.28 |
| Goose River | 0.42 | 7.42 |
| Patti Batjen | 12.04 | 14.20 |
| North Slope | 8.37 | 11.26 |
| Bonnie Glenn | 0.28 | 6.04 |
| Wizzard Lake | 1.45 | 6.89 |
| B Oil | 0.23 | 8.54 |
| New Crudes | | |
| Swan Hill | 0.47 | 8.5 |
| Carson Creek | 0.12 | 3.0 |
| Muskeg | 1.24 | 5.6 |
| Keg River AA | 0.44 | 2.6 |
| Keg River OO | 0.84 | 4.0 |
| Sulphur Point | 0.99 | 6.1 |
| Virginia Hills | 1.65 | 6.7 |
| North Kaybob | 1.61 | 2.6 |
| Snipe Lake | 2.53 | 8.7 |

EXAMPLES II AND III

Sludging Properties of Crude Oils

Crude oils (old and new) were examined to determine their sludging properties. The crude oil was blended on an equal volume basis, with 15% hydrochloric acid that did not contain iron and with 15% hydrochloric acid that did contain 5000 mg/L of ferric iron (Fe III). The iron used to contaminate the acid was a standard solution of ferric chloride.

The acid-crude oil mixture was placed in a 150° F. bath for 2 hours. The mixture was then filtered using Whatman filter paper, washed with kerosene, washed with isopropanol, dried and weighed. The total sludge was washed with n-pentane, dried and weighed to obtain the weight of asphaltenes. The total weight minus the weight of asphaltenes equals the weight of maltenes. Test results obtained using old crude oils are shown in Table 2. Test results obtained using new crude oils are shown in Table 3.

Test results show that maltenes are the prominent component of sludge. Test results show that new crude oils are more sensitive to Fe(III) than are old crude oils. Results indicate that maltenes may be more sensitive to Fe(III) than are asphaltenes. With respect to sludge formation, maltenes appear to be the more detrimental component of crude oil.

TABLE 11

| Ingredient | Test No. 7 Quantity % by Volume | Test No. 8 Quantity % by Volume | Test No. 9 Quantity % by Volume | Test No. 10 Quantity % by Volume | Test No. 11 Quantity % by Volume |
|---|---|---|---|---|---|
| Acetic Acid | 11.184 | 11.184 | 11.184 | 11.184 | 11.184 |
| Formic Acid | 9.089 | 9.089 | 9.089 | 9.089 | 9.089 |
| Acid Inhibitor | 0.27 | 0.27 | 0.27 | 0.27 | 0.27 |
| Solubilizer A | 0.598 | 0.598 | 0.598 | 0.598 | 0.598 |
| Solubilizer B | 0.35 | 0.35 | 0.35 | 0.35 | 0.35 |
| Anti-Sludger A | 0 | 0.825 | 0 | 0 | 0.825 |
| Anti-Sludger B | 0 | 0 | 0 | 0.275 | 0.275 |
| Organic Solvent | 0.178 | 0.702 | 0.178 | 0.328 | 0.853 |
| Freezing point depressant | 0.058 | 0.058 | 0.058 | 0.058 | 0.058 |
| Dispersants | 0.03 | 0.03 | 0.03 | 0.03 | 0.03 |
| Water | 78.243 | 76.894 | 78.243 | 77.818 | 76.468 |
| Total | 100.00 | 100.00 | 100.00 | 100.00 | 100.00 |
| $Fe^{+3}$ | 0 | 0 | 0 | 0 | 0 |

TABLE 11-continued

| Ingredient | Test No. 7 Quantity % by Volume | Test No. 8 Quantity % by Volume | Test No. 9 Quantity % by Volume | Test No. 10 Quantity % by Volume | Test No. 11 Quantity % by Volume |
|---|---|---|---|---|---|
| Sodium erythorbate | 0 | 0 | 0.37 lb-mole / 1000 gal. | 0 | 0.37 lb-mole / 1000 gal. |
| Sludge Results | | | | | |
| Screen | No | No | No | No | No |
| Bottle | Yes | Yes | Yes | Yes | Yes |

TABLE 12

| Ingredient | Test No. 1 Quantity % by Volume | Test No. 2 Quantity % by Volume | Test No. 4 Quantity % by Volume | Test No. 5 Quantity % by Volume | Test No. 6 Quantity % by Volume |
|---|---|---|---|---|---|
| Acetic Acid | 11.184 | 11.184 | 11.184 | 11.184 | 11.184 |
| Formic Acid | 9.089 | 9.089 | 9.089 | 9.089 | 9.089 |
| Acid Inhibitor | 0.27 | 0.27 | 0.27 | 0.27 | 0.27 |
| Solubilizer A | 0.598 | 0.598 | 0.598 | 0.598 | 0.598 |
| Solubilizer B | 0.35 | 0.35 | 0.35 | 0.35 | 0.35 |
| Anti-Sludger A | 0 | 0.825 | 0 | 0 | 0.825 |
| Anti-Sludger B | 0 | 0 | 0 | 0.275 | 0.275 |
| Organic Solvent | 0.178 | 0.702 | 0.178 | 0.328 | 0.853 |
| Freezing point depressant | 0.058 | 0.058 | 0.058 | 0.058 | 0.058 |
| Dispersants | 0.03 | 0.03 | 0.03 | 0.03 | 0.03 |
| Water | 78.243 | 76.894 | 78.243 | 77.818 | 76.468 |
| Total | 100.00 | 100.00 | 100.00 | 100.00 | 100.00 |
| $Fe^{+3}$ | 5000 MPL | 5000 MPL | 5000 MPL | 5000 MPL | 5000 MPL |
| Sodium erythorbate | 0 | 0 | 0.37 lb-Mole / 1000 gal. | 0 | 0.37 lb-Mole / 1000 gal. |
| Sludge Results | | | | | |
| Screen | Yes | Yes | Yes | Yes | No |
| Bottle | Yes | Yes | Yes | Yes | No |

EXAMPLE IV

Effect of HCl Concentration on Sludging

An investigation of the effect of HCl concentration on sludging was conducted. The acid contained 1.0% by volume nonionic anti-sludging agent and 5000 mg/L of ferric iron. Equal volumes of the acid and sludging crude were mixed and placed in a 200° F. bath for one hour. Sludge resulted if the concentration of HCl exceeded 2.0% (wt. %), Table 4.

TABLE 4

| Hydrochloric Acid Sludging Properties | |
|---|---|
| Prior Art Nonionic Anti-Sludging Agent: | 1.0% by volume of acid |
| Sodium erythorbate: | 80 lb/Mgal acid solution |
| Ferric Iron: | 5000 mg/L acid solution |
| Temperature: | 194° F. |
| Crude Oil: | Judy Creek (50 ml) |
| Pressure: | Atmospheric |

| % HCl (50 ml) | Test Result |
|---|---|
| 15 | Sludge |
| 10 | Sludge |
| 5 | Sludge |
| 4 | Sludge |
| 3 | Sludge |
| 2 | No Sludge |

EXAMPLE V

The organic acid blend of this invention controlled additive separation for days at ambient temperature and for more than 24 hours at 194° F., after being contaminated with iron, Table 5.

TABLE 5

| Additive Separation | |
|---|---|
| Acid: | Organic Acid Blend A |
| Sodium Erythorbate: | 5,000 mgl iron, 480 mg/50 ml |
| | 10,000 mgl iron, 960 mg/50 ml |
| | 15,000 mgl iron, 1440 mg/50 ml |
| | 20,000 mgl iron, 1920 mg/50 ml |
| Temperature: | 194° F. |
| Pressure: | Atmospheric |

| Ferric Iron Concentration (mg/L) | Separation |
|---|---|
| 5,000 | None in >24 hours |
| 10,000 | None in >24 hours |
| 15,000 | None in >6 hours |
| 20,000 | Trace in 1 hour* |

*A trace of separation was observed. Any degree of agitation will prevent separation.

EXAMPLE VI

Numerous studies have been made that show that iron dissolved by acid that contacts a crude oil enhances the formation of sludge.[2,3,4]

Delorey, J.R. and Taylor, R.S.: "Recent Studies into Iron/Surfactant/Sludge Interactions in Acidizing," Petroleum Society of CIM 85—36—38, Paper presented at the 1985 annual meeting, Edmonton, Alberta, June, 1985, 85—89.

Dood, C.G., Moore, J.W. and Denekac, M.O.: "Metalliferous Substances absorbed at Crude Petroleum-Water Surfaces", Ind. Eng. Chem (1951).

Jacobs, I.C., Thome, M.A.: "Asphaltene Precipitation During Acid Treatments," presented at 76th SPE Symposium on Formation Damage Control of the Society of Petroleum Engineers, Lafayette, LA., Feb. 26—27, 1986.

Investigations of the amount of iron dissolved by hydrochloric acid in acidizing operations have been made. One study of the mill scale (FeO·Fe$_2$O$_3$) in new 2 7/8, 6.5 lb tubing indicates that 690 gallons of 15% HCl will be required to react with the mill scale in 10,000 feet of pipe.[5] The acid would contain 85,938 mg/L total iron if the iron remained in solution. The total iron would contain 57,292 mg/L ferric iron, Fe(III), and 28,464 mg/L of ferrous iron, Fe(II).

Hall, B.E., Dill, W.R.: "Iron Control Additives for Limestone and Sandstone Acidizing of Sweet and Sour Wells," presented at SPE Formation Damage Symposium, Bakersfield, CA., Feb. 8—9, 1988.

These data emphasize the importance of pickling the tubulars prior to formation stimulation when using hydrochloric acid. If the tubulars are not pickled, the concentration of hydrochloric acid available for formation stimulation may be seriously depleted. The depleted acid may contain a concentration of iron that can not be effectively sequestered by an iron sequestering system and controlled to inhibit its effect on sludging.

Iron is found in the matrix of the formation as a component of hematite, magnetite, siderite, pyrite, chlorite and mixed layer clays.[6] These compounds contain both Fe(II) and Fe(III). However, hematite, magnetite and pyrite are relatively insoluble when compared to carbonate formations. The primary source of iron in a treating acid will be the tubulars, if the tubulars are not pickled.

Dill, W.R., Smolarchuk, F.A.: "Iron Control in Fracturing and Acidizing Operations," presented at CIM meeting, Calgary, Alberta, Canada, June, 1986.

Iron compounds found in the tubulars such as hematite (rust), mill scale (magnetite), pyrite (FeS), and siderite (FeCO$_3$) are relatively insoluble in the organic acid blends of this invention. The iron dissolved is primarily ferrous iron, Fe(II). This property may eliminate the practice of pickling the tubulars prior to formation acidizing. Table 6.

EXAMPLE VI

TABLE 6

| Solubility of Iron Compounds in Organic Acid Blend B (All Tests Run At 200° F.) | | | | |
|---|---|---|---|---|
| | Iron Dissolved (mg/L) | | | |
| | 30 minutes | | 60 minutes | |
| Iron Source | Fe(II) | Fe(III) | Fe(II) | Fe(III) |
| Fe$_2$O$_3$ | 0 | 67 | 0 | 67 |
| Fe$_3$O$_4$ | 445 | 0 | 445 | 0 |
| FeS | 13,534 | 0 | 16,829 | 0 |

EXAMPLE VII

It is generally accepted that blended acid and oil should achieve 90% separation in 10 minutes. Observations during the sludging tests described in Example VIII, below, indicate that the organic acid blend of this invention has excellent non-emulsifying properties and separation of the acid and oil phase occurred in less than 10 minutes. Table 7.

Live Acid Tests

Fifty ml of unspent acid at 194° F. is mixed with 50 ml of crude oil in a bottle and shaken to produce an emulsion. The bottle is then placed in a static bath maintained at 194° and atmospheric pressure to observe the time required for the acid and oil to separate. Acid separation in 10 minutes or less is considered an acceptable indicator of the non-emulsifying nature of the acid.

Spent Acid Tests

Fifty ml of unspent acid at 194° F. is mixed with 50 ml of oil and 100 grams of marble chips (4 mesh) in a bottle. The bottle is then placed in a static bath maintained at 194° F. and atmospheric pressure and allowed to stand until reaction between the acid and marble terminates. The bottle is then shaken to produce an emulsion and returned to the bath to observe the time required for the spent acid and oil to separate. Spent acid separation in ten minutes or less is considered an acceptable indicator of the non-emulsifying nature of the acid.

EXAMPLE VII

TABLE 7

| Emulsion Test Data Using Organic Acid Blend | | | | |
|---|---|---|---|---|
| Acid: Organic Acid Blend A | | | | |
| Pressure: Atmospheric | | | | |
| Temperature: 194° F. | | | | |
| Blend: 1:1 hot acid and oil shaken in bottle (50 ml:50 ml) and placed in 194° F. bath | | | | |
| | Separation Time | | | |
| | Live | Spent | Live | Spent |
| Acid* | Acid* | Acid* | Acid* | |
| 5,000 | 5,000 | 20,000 | 20,000 | |
| Crude Oil | Fe(3) | Fe(3) | Fe(3) | Fe(3) |
| Judy Creek 2-10 | <10 min | <10 min | <10 min | <10 min |
| H-Oil | " | " | " | " |
| Goose River | " | " | " | " |
| Patti Batjen | " | " | " | " |
| North Slope | " | " | " | " |
| Bonnie Glenn | " | " | " | " |
| Wizzard Lake | " | " | " | " |
| B-Oil | " | " | " | " |
| Virginia Hills | " | " | " | " |

*Live Acid and Spent Acid containing 5,000 mpl of Fe(3) was the Organic Acid Blend A of this invention. Live Acid and Spent Acid containing 20,000 mpl of Fe(3) was Organic Acid Blend A of this invention*.
**Containing 480 mg sodium erythorbate per 50 ml acid blend.
***Containing 1920 mg sodium erythorbate per 50 ml acid blend.

EXAMPLE VIII

The Organic Acid Blend A containing 480 mg of sodium erythorbate per 50 ml of acid was tested in the laboratory to determine its sludging properties with various sludging crude oils. Live acid tests were conducted utilizing 50 ml acid and 50 ml crude oil at 194° F. and atmospheric pressure. Spent acid sludging tests were conducted by placing the acid-oil mixture in the bath and adding marble chips to spend the acid. Ferric ion was present to the extent of 5,000 mg per liter of acid. After 1 hour the mixture was poured through a 100 mesh sieve to detect sludge. Sludge was not formed with the crude oils tested. Live Acid tests and Spent Acid tests were conducted on each of the crudes listed in Table 8 below. No sludge was observed in any of the tests.

TABLE 8

| Crude Oil Tested With the Organic Acid Blend | |
|---|---|
| Laboratory sludging tests conducted at 194° F. have shown that the organic acid system is an effective non-sludging system in live and spent acid tests with at least the following crude oils: | |
| Judy Creek (old) | Judy Creek (new) |
| Virginia Hills | Boundary Lake |
| Carson Creek | Goose River |
| North Kaybob | Patti Batjen |

TABLE 8-continued

| Crude Oil Tested With the Organic Acid Blend | |
|---|---|
| Swan Hills | North Slope |
| Wizzard Lake | Bonnie Glenn |
| Snipe Lake | Keg River AA |
| Muskeg | Keg River OO |
| Sulphur Point | |

EXAMPLE IX

Corrosion data demonstrate that the organic acid blend of this invention can be inhibited to provide two corrosion. Corrosion tests were conducted with up to 20,000 mg ferric iron/L in the blend. Corrosion rates ranged from 0.007 lb/ft$^2$ with 5000 mg/L of ferric iron to 0.021 lb/ft$^2$ with 20,000 mg/L of ferric iron, Table 9.

TABLE 9

| Organic Acid Blend Corrosion Testing | | | | |
|---|---|---|---|---|
| Temperature: | 200° F. | | | |
| Sodium Erythorbate: | 5,000 mgl iron, 960 mg | | | |
| | 20,000 mgl iron, 3840 mg | | | |
| Pressure: | Atmospheric | | | |
| Blend Volume: | 100 ml | | | |
| Steel: | N-80 | | | |
| Time: | 6 hours | | | |

| Organic Acid Composition | Test | Fe(III) (mg/L) | Solubilizing Agent (%) | Corrosion Rate (lb/ft$^2$) | Additive Separation |
|---|---|---|---|---|---|
| Blend A | 1 | 5,000 | 0.35 | 0.011 | No |
| | 2 | 20,000 | 0.35 | 0.021 | Yes |
| Blend C | 3 | 5,000 | 0.70 | 0.007 | No |
| | 4 | 20,000 | 0.70 | 0.021 | No |
| Blend D | 5 | 5,000 | 1.05 | 0.007 | No |
| | 6 | 20,000 | 1.05 | 0.021 | No |

Acceptable corrosion control is indicated if the corrosion rate is less than 0.05 lb/ft$^2$. The organic acid blend of this invention maintained a corrosion rate less than 0.05 lb/sq. ft. after exposure at a temperature of 200° F. for 6 hours and a ferric ion concentration of 20,000 mg/L. Additive separation was controlled by increasing the concentration of solubilizing agent in the blend by a factor up to three without adverse affect upon corrosion rate.

EXAMPLE X

Published data deal with the reaction properties of acetic acid and formic acid which are components of the organic acid blend of this invention. These data show that acetic acid reacted with carbonate rock will react to 42% to 60% of completion and that formic acid will react to 87% to 94% of completion.[4] These results are generally accepted for closed systems where limited rock surface area/unit volume of acid is contacted; where CO$_2$ generated by the reaction is not lost from the acid by diffusion into matrix permeability or dissolution into formation water and crude oil; and where dilution of the acid by formation water does not occur. These factors are involved in formation acidizing and force the reaction to completion.

Jacobs, I.C., Thome, M.A.: "Asphaltene Precipitation During Acid Treatments," presented at 7th SPE symposium on Formation Damage Control of the Society of Petroleum Engineers, Lafayette, LA., Feb. 26—27, 1986.

Co-mingling of acetic acid with crude oil increased the acetic acid spent by about 127%.[4] Other reaction data were obtained from spent acid sludging test where the organic acid blend of this invention was mixed with crude oil, on an equal volume basis, and reacted on marble chips at 194° F., atmospheric pressure. In this test, the blend spent to a residual acid concentration of about 1.8%, Table 10.

TABLE 10

| Residual Acid in Spent Organic Acid Blend A | |
|---|---|
| Acid:Oil Blend: | 50:50 ml |
| Temperature: | 194° F. |
| Pressure: | Atmospheric |
| Ferric Iron: | 5000 mgl |
| Reactant: | 100 g Marble Chips (4 mesh) |
| Sodium Erythorbate: | 480 mg per 50 ml |
| Contact Time: | 1 hour |

| Crude Oil | % Residual Acid |
|---|---|
| Judy Creek | 2.2 |
| 2-10 | 1.9 |
| H-Oil | 1.7 |
| Goose River | 1.4 |
| Patti Batjen | 1.8 |
| North Slope | 2.1 |
| Bonnie Glenn | 1.5 |
| Wizzard Lake | 1.6 |
| B-Oil | 1.9 |
| Virginia Hills | 1.9 |
| No Oil | 1.0 |

EXAMPLE XI

The reaction rates of hydrochloric acid and the organic acid Blend A also containing 80 lb sodium erythorbate per 1000 gallons of blend were compared by reacting 14 ml of each acid with 40 grams of 12–25 mesh limestone preheated to 195° F. at 500 psig in a pressurized flow control vessel.

All of the hydrochloric acid was spent in less than two minutes. The blend of this invention was spent to about 5% residual acid (reported as HCl) in about two minutes and to about 2% residual acid (reported as HCl) in about 20 minutes.

Fifteen percent HCl reacts rapidly while the blend of this invention reacts slowly to achieve deeper penetration of live acid into a formation.

EXAMPLE XII

Concerning Requirement That All Three

Anti-Sludging Agents Be Present

Procedure:

Prepare aqueous acid solution to be tested and heat it to a temperature of 200° F.

Combine in a suitable bottle 50 milliliters of acid solution with 50 milliliters of Ventura Crude, a well-known sludging crude, and thoroughly mix.

Heat bottled mixture in a 200° F. bath for one hour.

Pour heated mixture through a 100 mesh screen.

Observe the absence or presence of non-dispersible sludge on the screen and on the bottle.

Record the observation.

The ingredients of each solution and the recorded observations are set out in Tables 11, 12, 13, 14 and 15 below wherein each test solution in Tables 12 and 14 did contain 5000 milligrams per liter of ferric (Fe$^{+3}$) ion, and each test solution in tables 11, 13 and 15 did not contain any added ferric (Fe$^{+3}$) ion.

Referring to Tables 11 and 12 notice, with the exception of tests 6 and 12, that sludge was produced in each test, but that when ferric ion was present, Table 12, there was apparently a greater quantity of sludge produced as compared to the condition when ferric ion was not present, Table 11. Tests 6 and 12, as contrasted with the other tests reported in Tables 11 and 12 contained all three anti-sludge agents and as a result no sludge was formed in tests 6 and 12 notwithstanding the presence or absence of ferric ion.

Still referring to Tables 11 and 12 tests 7 and 1 contained none of the anti-sludging agents and tests 8, 10 and 11 (Table 11) and 2, 4 and 5 (Table 12) each contained one of the anti-sludging agents.

Referring now to Tables 13 and 14 notice that sludge was produced in each test, but that when ferric ion was present, Table 14, there was apparently a greater quantity of sludge produced as compared to the condition when ferric ion was not present, Table 13.

Tables 13 and 14 record results obtained by using a combination of two of the three anti-sludging ingredients. Comparing the results shown in Tables 13 and 14 with the results shown in Tests 6 and 12 it is clear that all three anti-sludging agents were required to be present to completely prevent sludging. It is apparent from Test 15, where ferric ion was not present that the combination of anti-sludging agents A and B and the absence of the anti-sludge agent, sodium erythorbate, apparently produced only a very small quantity of sludge. It is equally apparent from the relevant comparative Test 12 that the presence of the ingredient missing from Test 15 is required to completely prevent the formation of sludge.

Test 14 when compared to Test 2 seems to indicate that the combination of anti-sludge agent A and sodium erythorbate seems to reduce, but not eliminate, sludging in the presence of ferric ion; but again as seen in Test 6 all three agents must be present to prevent all sludging.

Referring now to Table 15 there is shown the sludging results obtained, in the absence of ferric ion, upon the gradual reduction in concentration of sodium erythorbate—with all other ingredients being unchanged—from the amount shown in Test 12 (Table 11) to the amount shown in Test 19. It seems that to prevent sludging, the concentration of sodium erythorbate required is between the amount shown in Test 17 and the amount shown in Test 12.

TABLE 2

| Crude Sample | 25 ml Sample (g) | Total Sludge (g) | Asphaltenes (g) | Maltenes (g) | Total Sludge (g) | Asphaltenes (g) | Maltenes (g) |
|---|---|---|---|---|---|---|---|
| | | Old Crudes, Without Iron | | | Old Crudes With 5000 mpl Ferric Iron | | |
| H Oil | 20.03 | 0.25 | 0.10 | 0.15 | 0.37 | 0.12 | 0.25 |
| Judy Creek | 20.13 | 0.39 | 0.08 | 0.21 | — | — | — |
| G 2-10 | 20.70 | 0.55 | 0.36 | 0.19 | 0.54 | 0.21 | 0.33 |
| Goose River | 20.67 | 1.60 | 0.23 | 1.37 | 0.41 | 0.19 | 0.22 |
| Patti Batjen | 22.43 | 1.58 | 0.89 | 0.69 | 1.91 | 0.05 | 1.86 |
| North Slope | 21.19 | 0.44 | 0.34 | 0.10 | 1.05 | 0.29 | 0.76 |
| Bonnie Glenn | 20.19 | 0.01 | Trace | 0.00 | 0.18 | 0.08 | 0.10 |
| Wizzard Lake | 19.95 | 0.11 | 0.05 | 0.06 | 0.34 | 0.18 | 0.16 |
| B Oil | 20.74 | 0.00 | 0.00 | 0.00 | 0.20 | 0.11 | 0.09 |
| Virginia Hills | 24.51 | 2.36 | 0.85 | 1.51 | 0.52 | 0.38 | 0.14 |
| | | New Crudes, Without Iron | | | New Crudes With 5000 mpl Ferric Iron | | |
| Swan Hills | 20.48 | 0.06 | 0.01 | 0.05 | 0.25 | 0.16 | 0.09 |
| Carson Creek | 29.07 | 0.20 | 0.10 | 0.10 | 0.65 | 0.25 | 0.40 |
| Muskeg | 20.63 | 1.83 | 1.78 | 0.05 | 0.30 | 0.20 | 0.10 |
| Keg River AA | 19.20 | 0.05 | 0.02 | 0.03 | 0.21 | 0.10 | 0.11 |
| Keg River OO | 24.56 | 0.05 | 0.02 | 0.03 | 0.42 | 0.05 | 0.37 |
| Sulphur Point | 20.47 | 0.29 | 0.11 | 0.18 | 0.48 | 0.22 | 0.26 |
| Virginia Hills | 19.89 | 0.01 | 0.00 | 0.01 | 2.34 | 1.65 | 0.69 |
| N. Kaybob | 20.38 | 0.24 | 0.19 | 0.05 | 0.58 | 0.16 | 0.42 |
| Snipe Lake | 21.01 | 1.42 | 0.33 | 1.09 | 1.32 | 0.57 | 0.75 |

TABLE 3

| Crude Sample | 25 ml Sample (g) | Total Sludge (g) | Asphaltenes (g) | Maltenes (g) | Total Sludge (g) | Asphaltenes (g) | Maltenes (g) |
|---|---|---|---|---|---|---|---|
| | | New Crudes, Without Iron | | | New Crudes With 5000 mpl Ferric Iron | | |
| Swan Hills | 20.48 | 0.06 | 0.01 | 0.05 | 0.25 | 0.16 | 0.09 |
| Carson Creek | 29.07 | 0.20 | 0.10 | 0.10 | 0.65 | 0.25 | 0.40 |
| Muskeg | 20.63 | 1.83 | 1.78 | 0.05 | 0.30 | 0.20 | 0.10 |
| Keg River AA | 19.20 | 0.05 | 0.02 | 0.03 | 0.21 | 0.10 | 0.11 |
| Keg River OO | 24.56 | 0.05 | 0.02 | 0.03 | 0.42 | 0.05 | 0.37 |
| Sulphur Point | 20.47 | 0.29 | 0.11 | 0.18 | 0.48 | 0.22 | 0.26 |
| Virginia Hills | 19.89 | 0.01 | 0.00 | 0.01 | 2.34 | 1.65 | 0.69 |
| N. Kaybob | 20.38 | 0.24 | 0.19 | 0.05 | 0.58 | 0.16 | 0.42 |
| Snipe Lake | 21.01 | 1.42 | 0.33 | 1.09 | 1.32 | 0.57 | 0.75 |

TABLE 13

| Ingredient | Test No. 14 Quantity % by Volume | Test No. 16 Quantity % by Volume | Test No. 9 Quantity % by Volume |
|---|---|---|---|
| Acetic Acid | 11.184 | 11.184 | 11.184 |
| Formic Acid | 9.089 | 9.089 | 9.089 |
| Acid Inhibitor | 0.27 | 0.27 | 0.27 |
| Solubilizer A | 0.598 | 0.598 | 0.598 |
| Solubilizer B | 0.35 | 0.35 | 0.35 |
| Anti-Sludger A | 0.825 | 0.825 | 0 |
| Anti-Sludger B | 0.275 | 0 | 0.275 |
| Organic Solvent | 0.853 | 0.702 | 0.328 |
| Freezing point | 0.058 | 0.058 | 0.058 |

TABLE 13-continued

| Ingredient | Test No. 14 Quantity % by Volume | Test No. 16 Quantity % by Volume | Test No. 9 Quantity % by Volume |
|---|---|---|---|
| depressant | | | |
| Dispersant | 0.03 | 0.03 | 0.03 |
| Water | 76.468 | 76.894 | 77.818 |
| Total | 100.00 | 100.00 | 100.00 |
| $Fe^{+3}$ | 0 | 0 | 0 |
| Sodium erythorbate | 0 | 0.37 lb-mole / 1000 gal. | 0.37 lb-mole / 1000 gal. |
| Sludge Results | | | |
| Screen | No | No | No |
| Bottle | Yes, specks | Yes | Yes |

TABLE 14

| Ingredient | Test No. 13 Quantity % by Volume | Test No. 14 Quantity % by Volume | Test No. 3 Quantity % by Volume |
|---|---|---|---|
| Acetic Acid | 11.184 | 11.184 | 11.184 |
| Formic Acid | 9.089 | 9.089 | 9.089 |
| Acid Inhibitor | 0.27 | 0.27 | 0.27 |
| Solubilizer A | 0.598 | 0.598 | 0.598 |
| Solubilizer B | 0.35 | 0.35 | 0.35 |
| Anti-Sludger A | 0.825 | 0.825 | 0 |
| Anti-Sludger B | 0.275 | 0 | 0.275 |
| Organic Solvent | 0.853 | 0.702 | 0.328 |
| Freezing point depressant | 0.058 | 0.058 | 0.058 |
| Dispersant | 0.03 | 0.03 | 0.03 |
| Water | 76.468 | 76.894 | 77.818 |
| Total | 100.00 | 100.00 | 100.00 |
| $Fe^{+3}$ | 5000 MPL | 5000 MPL | 5000 MPL |
| Sodium erythorbate | 0 | 0.37 lb-mole / 1000 gal. | 0.37 lb-mole / 1000 gal. |
| Sludge Results | | | |
| Screen | Yes | No | Yes |
| Bottle | Yes | Yes | Yes |

TABLE 15

| Ingredient | Test No. 17 Quantity % by Volume | Test No. 18 Quantity % by Volume | Test No. 19 Quantity % by Volume |
|---|---|---|---|
| Acetic Acid | 11.184 | 11.184 | 11.184 |
| Formic Acid | 9.089 | 9.089 | 9.089 |
| Acid Inhibitor | 0.27 | 0.27 | 0.27 |
| Solubilizer A | 0.598 | 0.598 | 0.598 |
| Solubilizer B | 0.35 | 0.35 | 0.35 |
| Anti-Sludger A | 0.825 | 0.825 | 0 |
| Anti-Sludger B | 0.275 | 0.275 | 0.275 |
| Organic Solvent | 0.853 | 0.853 | 0.853 |
| Freezing point depressant | 0.058 | 0.058 | 0.058 |
| Dispersant | 0.03 | 0.03 | 0.03 |
| Water | 76.468 | 76.468 | 76.468 |
| Total | 100.00 | 100.00 | 100.00 |
| $Fe^{+3}$ | 0 | 0 | 0 |
| Sodium erythorbate | 0.185 lb-mole / 1000 gal. | 0.093 lb-mole / 1000 gal. | 0.046 lb-mole / 1000 gal. |
| Sludge Results | | | |
| Screen | No | No | No |
| Bottle | Yes, small trace | Yes, trace > 17 | Yes, large trace > 18 |

In Tables 11, 12, 13, 14 and 15 the reported volume percentage of acetic acid is based upon the use of 100% by weight acid; however, a material consisting of acetic anhydride and glacial acetic acid in a ratio of 1.5 weight parts acetic anhydride to 1 weight part of glacial acetic acid was actually used. Also the reported percentage of formic acid is based upon the use of 100% by weight acid, however, the acid actually used was 88% by weight formic acid. The acetic acid concentration in the test solutions was about 11.15 percent by weight of solution and the formic acid concentration in the test solutions was about 10.51 percent by weight of solution.

The reported acid inhibitor is one which will inhibit the corrosive effect of the organic acids used on ferrous metals. The specific inhibitor utilized is comprised in major part of amine based compounds comprised of quaternized heterocyclic nitrogen compounds and aniline derivatives and in minor part of a dispersant consisting of ethoxylated nonyl phenol.

Solubilizer A is an oxyalkylated alkyl phenol.
Solubilizer B is polyoxyethylene ether alcohol.
Anti-Sludger A is dimethyl dicoco quaternary ammonium chloride.
Anti-Sludger B is dimethyl benzyl tallow quaternary ammonium chloride.

The anti-sludging agents and the solubilizing agents each contain a quantity of methanol and isopropyl alcohol to assist in the solution of the agents in the aqueous acid solution.

Finally each solubilizing agent contains a minor portion of dialkyl and ethylene glycol which serve to depress the freezing points of these ingredients.

Having described the invention that which is claimed is:

1. A method of preventing the formation of sludge in a sludging crude oil upon contact with an acid, said method being comprised of contacting said sludging crude oil with an aqueous acidic composition comprised of acetic acid, formic acid, a first quaternary ammonium salt, a second quaternary ammonium salt and an iron control agent selected from the group consisting of ascorbic acid, erythorbic acid, the alkali metal and ammonium salts of said acids, γ-lactones of said acids and mixtures thereof;

said first quaternary ammonium salt being defined by the first formula

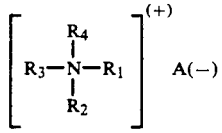

and said second quaternary ammonium salt being defined by the second formula

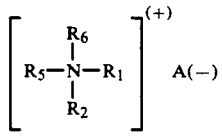

wherein:
N is nitrogen;
A is selected from halides, sulfate, formate and acetate;
$R_1$ is an alkyl group having 1 to 3 carbon atoms;
$R_2$ is an alkyl group having 1 to 3 carbon atoms;

$R_3$ is a straight chain hydrocarbon group having in the range of 8 to 18 carbon atoms;

$R_4$ is a straight chain hydrocarbon group having in the range of 8 to 18 carbon atoms;

$R_5$ is a straight chain hydrocarbon group having in the range of 12 to 18 carbon atoms; and $R_6$ is an aralkyl group having in the range of 7 to 10 carbons atoms.

2. The method of claim 1 wherein the concentration of said acetic acid does not exceed about 21 percent by weight of said composition, the concentration of said formic acid does not exceed about 11 percent by weight of said composition, the concentration of said first quaternary ammonium salt is in the range of from about 0.275 to about 1.1 percent by volume of said composition, the concentration of said second quaternary ammonium salt is in the range of from about 0.11 to about 0.825 percent by volume of said composition, and the concentration of said iron control agent is at least about 0.23 lb-mole per 1000 gallons of said composition.

3. The method of claim 2 wherein said sludging crude contains a quantity of ferric ion and said iron control agent is present in said composition in the range of from about 0.34 to about 0.54 moles per mole of ferric ion or about 0.23 lb-moles per 1000 gallons of composition which ever is greater.

4. The method of claim 3 wherein said composition is further comprised of a first solubilizing agent and a second solubilizing agent wherein said first solubilizing agent is a polyoxyethylene ether alcohol present in said composition in the range of from about 0.035 to about 0.7 percent by volume of said composition and said second solubilizing agent is an oxyalkylated alkyl phenol present in the composition in an amount up to about 0.6 percent by volume of said composition.

5. The method of claim 4 wherein said composition each said $R_3$ group and said $R_4$ group in said first quaternary ammonium salt is substantially saturated having in the range of 12 to 16 carbon atoms, said $R_5$ group in said second quaternary ammonium salt is substantially saturated having in the range of 14 to 18 carbon atoms, said A group is a halide and said iron control agent is an alkali metal salt.

6. The method of claim 5 wherein said first quaternary ammonium salt is dimethyl dicoco quaternary ammonium chloride, said second quaternary ammonium salt dimethyl benzyl tallow quaternary ammonium chloride and said iron control agent is sodium erythorbate wherein the volume ratio of said first quaternary ammonium salt to said second quaternary ammonium salt in said composition is in the range of from about 1.3 to about 3.

7. The method of claim 6 wherein said first solubilizing agent is an ethoxylated fatty alcohol wherein a substantially saturated fatty alcohol having in the range of 10 to 15 carbon atoms is reacted with from about 1 to about 30 moles of ethylene oxide and wherein said second solubilizing agent is an ethoxylated alkyl phenol wherein the basic phenol has been reacted with from about 1 to about 30 moles of ethylene oxide and the alkyl substituent has in the range of from 6 to 10 carbon atoms.

8. A method of increasing the permeability of a subterranean calcareous formation containing a sludging crude oil while preventing the precipitation in said formation of sludge, ferric compounds and calcium compounds said method being comprised of:

conducting an aqueous acidic composition to said formation through tubing disposed in a borehole penetrating said formation;

forcing said acidic composition into contact with said formation; and permitting said acidic composition to react with and dissolve materials contained therein to thereby increase the permeability of said formation;

wherein said aqueous acidic composition is comprised of acetic acid, formic acid, a first quaternary ammonium salt, a second quaternary ammonium salt and an iron control agent selected from the group consisting of ascorbic acid, erythorbic acid, the alkali metal and ammonium salts of said acids, γ-lactones of said acids and mixtures thereof;

said first quaternary ammonium salt being defined by the first formula

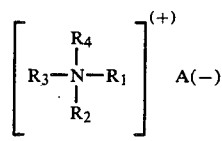

and said second quaternary ammonium salt being defined by the second formula

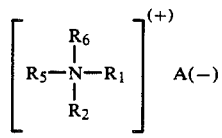

wherein:

N is nitrogen;

A is selected from halides, sulfate, formate and acetate;

$R_1$ is an alkyl group having 1 to 3 carbon atoms;

$R_2$ is an alkyl group having 1 to 3 carbon atoms;

$R_3$ is a straight chain hydrocarbon group having in the range of 8 to 18 carbon atoms;

$R_4$ is a straight chain hydrocarbon group having in the range of 8 to 18 carbon atoms;

$R_5$ is a straight chain hydrocarbon group having in the range of 12 to 18 carbon atoms; and $R_6$ is an aralkyl group having in the range of 7 to 10 carbons atoms.

9. The method of claim 8 wherein the concentration of said acetic acid does not exceed about 21 percent by weight of said composition, the concentration of said formic acid does not exceed about 11 percent by weight of said composition, the concentration of said first quaternary ammonium salt is in the range of from about 0.275 to about 1.1 percent by volume of said composition, the concentration of said second quaternary ammonium salt is in the range of from about 0.11 to about 0.825 percent by volume of said composition, and the concentration of said iron control agent is at least about 0.23 lb-mole per 1000 gallons of said composition.

10. The method of claim 9 wherein said sludging crude contains a quantity of ferric ion and said iron control agent is present in said composition in the range of about 0.34 to about 0.54 moles per mole of ferric ion or about 0.23 lb-moles per 1000 gallons of composition which ever is greater.

11. The method of claim 10 wherein said composition is further comprised of a first solubilizing agent and a second solubilizing agent wherein said first solubilizing agent is a polyoxyethylene ether alcohol present in said composition in the range of from about 0.035 to about 0.7 percent by volume of said composition and said second solubilizing agent is an oxyalkylated alkyl phenol present in the composition in an amount up to about 0.6 percent by volume of said composition.

12. The method of claim 11 wherein said composition each said $R_3$ group and said $R_4$ group in said first quaternary ammonium salt is substantially saturated having in the range of 12 to 16 carbon atoms, said $R_5$ group in said second quaternary ammonium salt is substantially saturated having in the range of 14 to 18 carbon atoms, said A group is a halide and said iron control agent is an alkali metal salt.

13. The method of claim 12 wherein said first quaternary ammonium salt is dimethyl dicoco quaternary ammonium chloride, said second quaternary ammonium salt is dimethyl benzyl tallow quaternary ammonium chloride and said iron control agent is sodium erythorbate wherein the volume ratio of said first quaternary ammonium salt to said second quaternary ammonium salt in said composition is in the range of from about 1.3 to about 3.

14. The method of claim 13 wherein said first solubilizing agent is an ethoxylated fatty alcohol wherein a substantially saturated fatty alcohol having in the range of 10 to 15 carbon atoms is reacted with from about 1 to about 30 moles of ethylene oxide and wherein said second solubilizing agent is an ethoxylated alkyl phenol wherein the basic phenol has been reacted with from about 1 to about 30 moles of ethylene oxide and the alkyl substituent has in the range of from 6 to 10 carbon atoms.

* * * * *